Feb. 19, 1957  A. F. SHUM  2,782,050
VEHICLE SPRING SUSPENSION
Filed Feb. 14, 1955  3 Sheets-Sheet 3
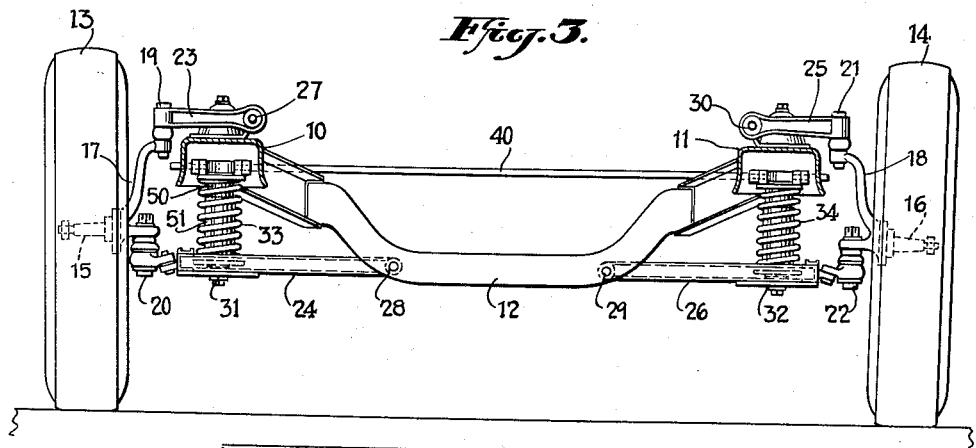
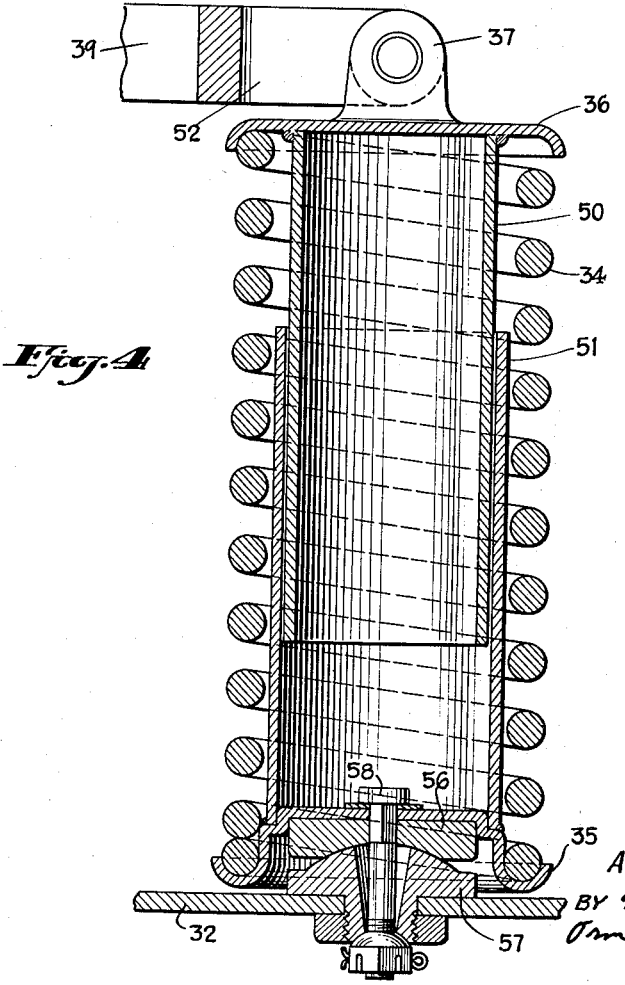
INVENTOR.
ALDEN F. SHUM.
BY Ward, Neal, Hazelton,
Orwell McElhannon
ATTORNEYS.

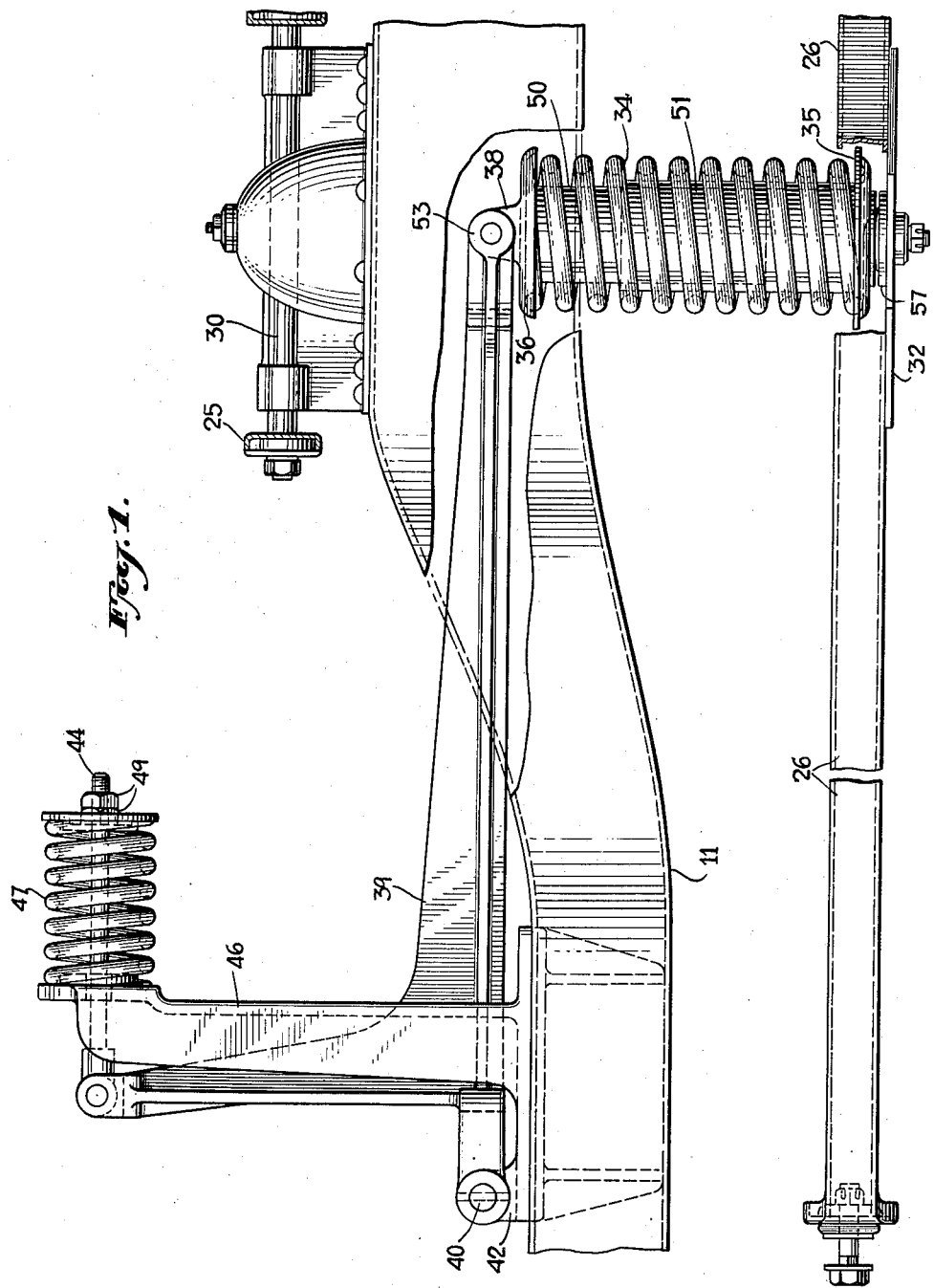

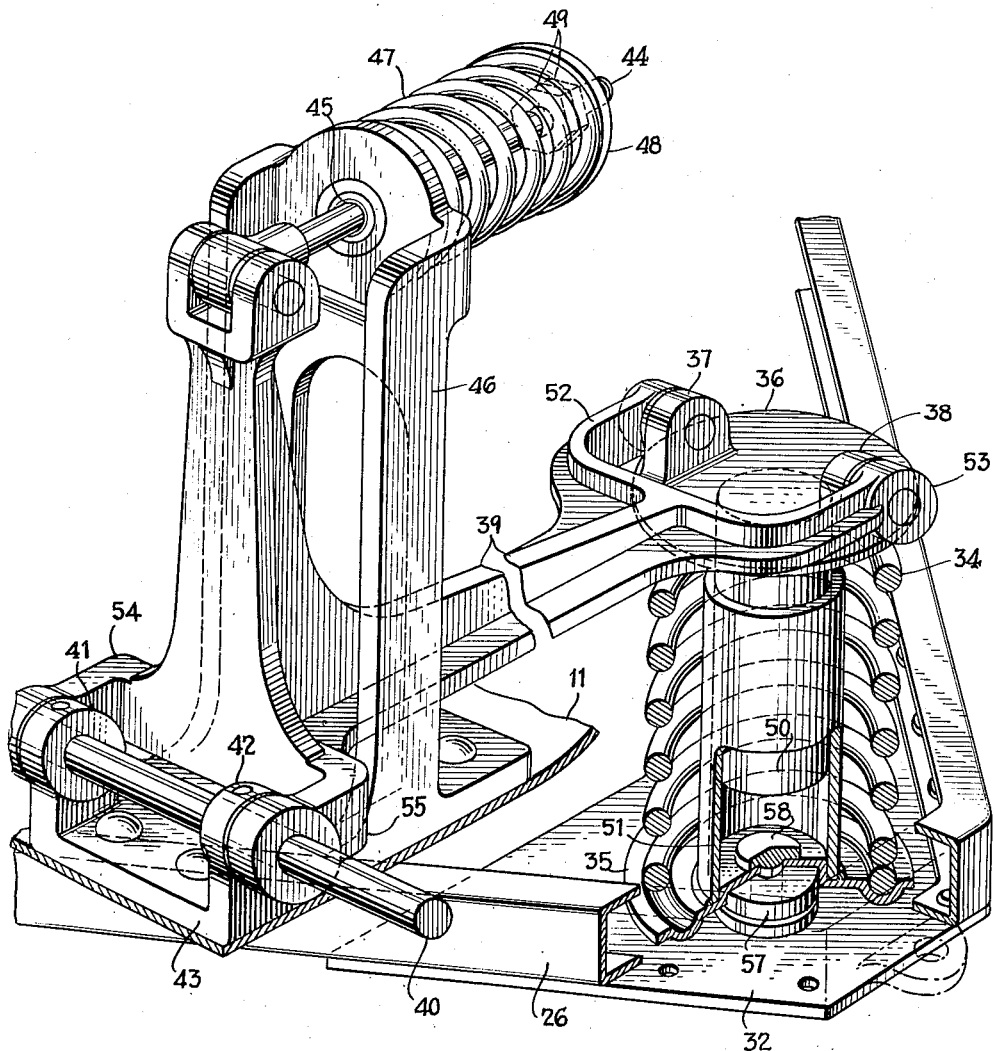

United States Patent Office 2,782,050
Patented Feb. 19, 1957

2,782,050

VEHICLE SPRING SUSPENSION

Alden F. Shum, York, Maine

Application February 14, 1955, Serial No. 487,825

6 Claims. (Cl. 280—124)

This invention relates to mountings for vehicle wheels and particularly to a mounting suitable for individual springing of the front and rear wheels of automobiles.

The use of springing in connection with the mounting of wheels of vehicles is well known and is used primarily for the purpose of absorbing road shocks and thereby eliminating discomfort to passengers in the vehicles.

Although a large amount of effort has been devoted to the development of such springing, the systems thus far devised have not been satisfactory either because they do not properly absorb the road shocks, they cause undesirable tilting of the vehicle when going around curves or they are too complicated to be practical for ordinary vehicles or to fit within the space available in such vehicles.

Generally speaking, the road shocks exert forces on the wheels of the vehicle directed principally in the vertical direction, and if the forces are transferred from the wheels to the frame of the vehicle in the same direction, then the road shocks cause up and down motion of the frame. It has been proposed to absorb the forces by applying them longitudinally of the vehicle frame so as to reduce such up and down motion of the frame. However, the apparatus thus far proposed for converting the vertical forces applied to the wheels into longitudinal forces on the frame have eliminated only part of the up and down motion and have been impractical.

With the mounting of the present invention, the up and down motion of the vehicle frame is substantially reduced and, in addition, tilting of the frame when the vehicle is going around curves is largely avoided. These results are obtained with a relatively simple mounting arrangement which occupies a relatively small space and which is economical to manufacture.

In accordance with my invention the wheel supporting members are carried by the frame of the vehicle and are movable with respect thereto. One of the wheel supporting members is connected to one portion of a lever by means of a resilient member such as a spring and the lever is mounted on the frame with its pivot axis extending substantially horizontally and perpendicularly to the length of the frame. Another portion of the lever is connected to the frame by a resilient member such as a spring in such a manner that the resilient member resists movement of the wheel supporting member, and the forces applied to the latter resilient member by the wheel supporting member are applied to the frame in a direction extending longitudinally thereof.

The invention may be better understood by referring to the following detailed description of the manner in which I now prefer to practice the invention and to the accompanying drawings in which:

Fig. 1 is a front elevation view of a portion of a vehicle having the mounting apparatus of the invention thereon;

Fig. 2 is an enlarged, fragmentary, perspective view of a portion of the apparatus shown in Fig. 1;

Fig. 3 is an enlarged, side elevation view of a portion of the apparatus shown in Fig. 1; and Fig. 4 is an enlarged, cross-sectional view of a portion of the apparatus shown in the preceding figures.

Referring to Fig. 3, the frame of the vehicle comprises a pair of longitudinally extending frame members 10 and 11 and a cross member 12. The wheels 13 and 14 of the vehicle are mounted on spindles 15 and 16 whose axes extend substantially horizontally and extend substantially perpendicularly to the length of the frame in the normal positions of the wheels 13 and 14. The spindles 15 and 16 form part of the wheel supporting apparatus which also includes L-haped members 17 and 18 pivotally mounted on ball-ended pins 19—22 which are supported by arm members 23—26. The members 23—26 are pivotally connected to the frame by horizontally extending pins 27—30 so that the wheel supporting apparatus and hence the wheels may move relative to the frame, the ends of arms or members 24 and 26 moving vertically and toward the frame when the wheels 13 and 14 encounter objects in the roadway. Members 24 and 26 carry plates 31 and 32 which are connected to springs 33 and 34 which, as will hereinafter be described, are connected to one portion of arm forming part of the mounting apparatus of the invention.

Referring to Figs. 2 and 4, which show the mounting apparatus for the wheel 14, it being understood that the mounting apparatus for wheel 13 is the same as the mounting apparatus for wheel 14 except that it is of opposite hand, it will be seen that the spring 34 is held at its lower end by a plate or disc member 35 which is mounted so that it is free to tilt with respect to the plate 32. The opposite end of spring 34 engages a further plate or disc member 36 which is pivotally connected at 37 and 38 to one end of a bell crank lever 39 which has its pivot axis extending substantially horizontally and in a direction substantially perpendicular to the lengthwise direction of the frame. The member 36 is free to move with respect to the frame member 11. The lever 39 pivots about the axis of rod or shaft 40, the shaft 40 being held in a pair of brackets 41 and 42 forming part of a bracket 43 which is secured to the frame member 11.

The opposite end of the lever 39 is pivotally connected to a rod 44 which extends through an aperture 45 in an upstanding portion 46 of the bracket 43. The rod 44 is encircled by a further spring 47 which is held in position by a cupped disc 48, the disc 48 being engaged by nuts 49 threaded on the rod 44. The tension of the spring 47 may be adjusted by means of nuts 49.

It will be observed from the above that when the member 26 and hence the plate 32 is forced upwardly by the wheel 14, the spring 34 is compressed and applies an upward force to the end of the lever 39 connected to the member 36. The member 35 is free to tilt during the upward movement of the plate 32. The upward force applied to lever 39 by the spring 34 causes the lever 39 to rotate about the axis of the shaft 40 and hence causes compression of the spring 47 which acts between the disc 48 and the upstanding portion 46 of the bracket 43. According, the upward force applied by the wheel 14 to the spring 34 is opposed or absorbed by the spring 47 which acts in a direction extending substantially parallel to the length of the frame. For this reason, up and down movement of the wheel 14 and hence of the member 26 causes relatively little up and down movement of the frame of the vehicle.

Movement of the wheel supporting members with respect to the frame is also guided by the member 50 which is secured to the member 36 and which extends toward the member 35. The member 50 may be a hollow sleeve as shown or it may be a solid pin. The member 50 is received within a sleeve 51 and is slidable therein. The sleeve 51 is shorter than the distance between members 35 and 36 and is secured to the member 35. Separation of the pin 50 and the sleeve 51 may be prevented by welding or otherwise securing the ends of spring 34 to the members 35 and 36 or such separation may be prevented in any other well known manner.

Tilting or swaying of the vehicle frame is minimized by providing a relatively large spacing between the arms 52 and 53 of the lever 39 and by providing a relatively large spacing between the arms 54 and 55 of the lever 39. In addition, greater stability is provided by extending the rod 40 across the entire front of the frame as shown in Fig. 3 although it will be understood that the rod 40 may be formed in two parts which are not connected.

The means for guiding the movement of the wheel mounting members and the construction which permits tilting of the member 35 are shown in greater detail in Fig. 4. Preferably, the member 35 is secured to a hardened bearing piece 56 which has a concave inner surface which engages the convex upper face of a hardened bearing piece 57. The bearing piece 57 is secured to the plate 32 and the plate 35 is held in the position shown in Fig. 4 by a pin 58. The pin 58 fits through apertures in the plate 35 and in the bearing pieces 56 and 57. Sufficient clearance is provided between the walls of the apertures and the body of the pin 58 to permit the plate 35 to tilt slightly as the member 26 moves up and down.

It will be understood that other types of ball and socket connections may be substituted for the connection between member 35 and the member 32 shown in Fig. 4, and if desired, the plate 35 may be rigidly fastened to the member 32 provided that the clearance between member 50 and the member 51 is sufficient to permit tilting of the member 51 with respect to the member 50 without binding during the up and down movement of the plate 32.

It will be noted from the construction described above that in addition to reducing the up and down movement of the frame of the vehicle and to the reduction in tilting which can be obtained with the mounting arrangement of my invention, the mounting arrangement of my invention results in an increase in the effective wheel base of the vehicle without an increase in the distance between the axes of the wheels because the effective loading point of the wheel on the frame is at the axis of the shaft 40.

Having thus described my invention with particular reference to the preferred form thereof and having shown and described certain modifications, it will be obvious to those skilled in the art to which the invention pertains, after understanding my invention, that various changes and other modifications may be made therein without departing from the spirit and scope of my invention, as defined by the claims appended thereto.

What is claimed as new and desired to be secured by Letters Patent is:

1. A vehicle wheel mounting comprising a frame, a relatively movable wheel-supporting member carried by said frame, means for guiding the movement of said supporting member with respect to said frame, a lever pivotally mounted on said frame with its pivot axis substantially perpendicular to the lengthwise direction of said frame and to the direction of movement of said supporting member, a compressible spring acting between one portion of said lever and said supporting member and urging said lever and said supporting member apart, and means including a spring interconnecting another portion of said lever and said frame, said last-mentioned spring acting in the direction which resists and which is transverse to the direction of movement of said supporting member toward said frame.

2. A vehicle wheel mounting comprising a frame, a relatively movable wheel-supporting member carried by said frame, means for guiding the movement of said supporting member with respect to said frame, a bell crank pivotally mounted on said frame with its pivot axis substantially perpendicular to the lengthwise direction of said frame and with an arm above said member, means pivotally connected to said arm of said bell crank, a compressible spring mounted and acting between said last-mentioned means and said supporting member, and means including a spring interconnecting the other arm of said bell crank and said frame, said last-mentioned spring acting in the direction which resists and which is transverse to the direction of movement of said supporting member toward said frame.

3. A vehicle wheel mounting comprising a horizontally extending frame, a vertically movable wheel-supporting member carried by said frame, means for guiding the movement of said supporting member with respect to said frame, a lever pivotally mounted on said frame with its pivot axis extending horizontally and substantially perpendicular to the lengthwise direction of said frame, means pivotally connected to one portion of said lever, a substantially vertically extending compressible spring mounted and acting between said last-mentioned means and said supporting member, said spring urging said last-mentioned means upwardly and said supporting member downwardly and means including a spring interconnecting another portion of said lever and said frame, said last-mentioned spring acting in the direction which resists and which is transverse to the direction of movement of said supporting member toward said frame.

4. A vehicle wheel mounting comprising a frame, a relatively movable wheel-supporting member carried by said frame, a pair of spring engaging members, one of said pair of members being movably mounted adjacent said frame and the other of said pair of members being mounted on said supporting member, a sleeve mounted on one of said pair of members and extending toward the other of said pair of members, a pin mounted on the other of said pair of members and extending within said sleeve, said pin being slidable in a predetermined direction with respect to said sleeve, a compressible spring mounted between said pair of members and urging said members apart, a lever pivotally mounted on said frame with its pivot axis substantially perpendicular to said direction and to the lengthwise direction of said frame, means pivotally interconnecting one portion of said lever with said one member mounted adjacent said frame and means including a spring interconnecting another portion of said lever and said frame, said last-mentioned spring acting in the direction which resists movement of said supporting member toward said frame and which extends substantially parallel to the length of said frame.

5. A vehicle wheel mounting comprising a frame, a relatively movable wheel-supporting member carried by said frame, a pair of spring engaging members, one of said pair of members being movably mounted adjacent said frame and the other of said pair of members being tiltably mounted on said supporting member, a sleeve mounted on one of said pair of members and extending toward the other of said pair of members, a pin mounted on the other of said pair of members and extending within said sleeve, said pin being slidable with respect to said sleeve and in a predetermined direction extending substantially perpendicular to said frame, a compressible spring mounted between and engaged by said pair of members, a bell crank pivotally mounted on said frame with its pivot axis substantially perpendicular to said direction and to the lengthwise direction of said frame, means pivotally interconnecting one arm of said bell crank with said one member mounted adjacent said frame and means including a spring interconnecting the other arm of said bell crank and said frame, said last-mentioned spring acting in the direction which resists movement of said supporting member toward said frame.

6. A vehicle wheel mounting comprising a horizontally extending frame, a vertically movable wheel-supporting member carried by said frame and having a horizontally extending wheel spindle thereon, a pair of spring engaging members, one of said pair of members being movably mounted adjacent said frame and the other of said pair of members being tiltably mounted on said supporting member and being spaced below said one member, a sleeve mounted on one of said pair of members and extending toward the other of said pair of members, a pin mounted on the other of said pair of members and extending within said sleeve, said pin being vertically slidable with respect to said sleeve, a compressible spring mounted between and engaged by said pair of members, a bell crank pivotally mounted on said frame with its pivot axis substantially horizontal and extending substantially parallel to the axis of said spindle in the normal position thereof, means pivotally interconnecting one arm of said bell crank with said one member mounted adjacent said frame and means including a horizontally acting spring interconnecting the other arm of said bell crank and said frame, said last-mentioned spring acting in the direction which resists vertical movement of said supporting member.

References Cited in the file of this patent
UNITED STATES PATENTS

| | | |
|---|---|---|
| 1,111,045 | Tibbits | Sept. 22, 1914 |
| 2,658,748 | Premoli | Nov. 10, 1953 |